United States Patent [19]
Mock et al.

[11] Patent Number: 4,760,714
[45] Date of Patent: * Aug. 2, 1988

[54] ARTEFACT BAND WITH BONDED CLASP

[75] Inventors: Elmar Mock, Pery; Jean-Marie Hotz, Frinvillier, both of Switzerland

[73] Assignee: ETA SA Fabriques d'Ebauches, Grenchen, Switzerland

[*] Notice: The portion of the term of this patent subsequent to Oct. 20, 2004 has been disclaimed.

[21] Appl. No.: 844,439

[22] Filed: Mar. 26, 1986

[30] Foreign Application Priority Data

Apr. 2, 1985 [FR] France .................................. 85 05108

[51] Int. Cl.⁴ ............................................... A44C 5/00
[52] U.S. Cl. .......................................... 63/3; 368/280; 368/282; 224/164; 224/178
[58] Field of Search ........................ 63/2, 3, 5 R, 9, 11; 24/16 PB, 17 A, 17 AP, 19, 265; 248/74 PB; 224/164–165, 170, 175, 176, 179; 2/170; 40/21 C, 304; D11/3, 87; D10/30, 32; D3/43

[56] References Cited

U.S. PATENT DOCUMENTS

| 2,635,315 | 4/1953 | Kaufman | 24/206 |
| 3,545,198 | 12/1970 | Loftus | 368/281 |
| 3,581,347 | 3/1970 | Verspieren | 24/16 |
| 3,956,802 | 5/1976 | Kanzaka | 24/206 B |
| 3,962,013 | 6/1976 | Mashida | 156/215 |
| 4,178,751 | 12/1979 | Liautaud | 368/281 |
| 4,183,986 | 1/1980 | Blaetterlein | 428/160 |
| 4,287,644 | 9/1981 | Durand | 24/16 PB |
| 4,417,753 | 11/1983 | Bacehowski et al. | 285/21 |
| 4,462,697 | 7/1984 | Thompson | 368/282 |
| 4,580,319 | 4/1986 | Paradis | 24/16 PB |
| 4,615,185 | 10/1986 | Bollinger | 63/5 R |

FOREIGN PATENT DOCUMENTS

| 2165852 | 8/1973 | France . |
| 518697 | 3/1972 | Switzerland . |
| 628787 | 3/1982 | Switzerland . |
| 1555848 | 2/1978 | United Kingdom . |
| 2113975 | 8/1983 | United Kingdom . |

Primary Examiner—Robert A. Hafer
Assistant Examiner—Kevin G. Rooney
Attorney, Agent, or Firm—Pollock, Vande Sande & Priddy

[57] ABSTRACT

The fancy artefact described has a band (1) made of a first thermoplastic plastic material and a clasp (4) which is solid with the band and which is made of a second thermoplastic plastic material which may have a melting temperature greater than that of the first plastic material. One such artefact may be a wristlet having a pair of bands, the clasp being provided on the free end of one band and being fastenable to the free end of the other band.

14 Claims, 2 Drawing Sheets

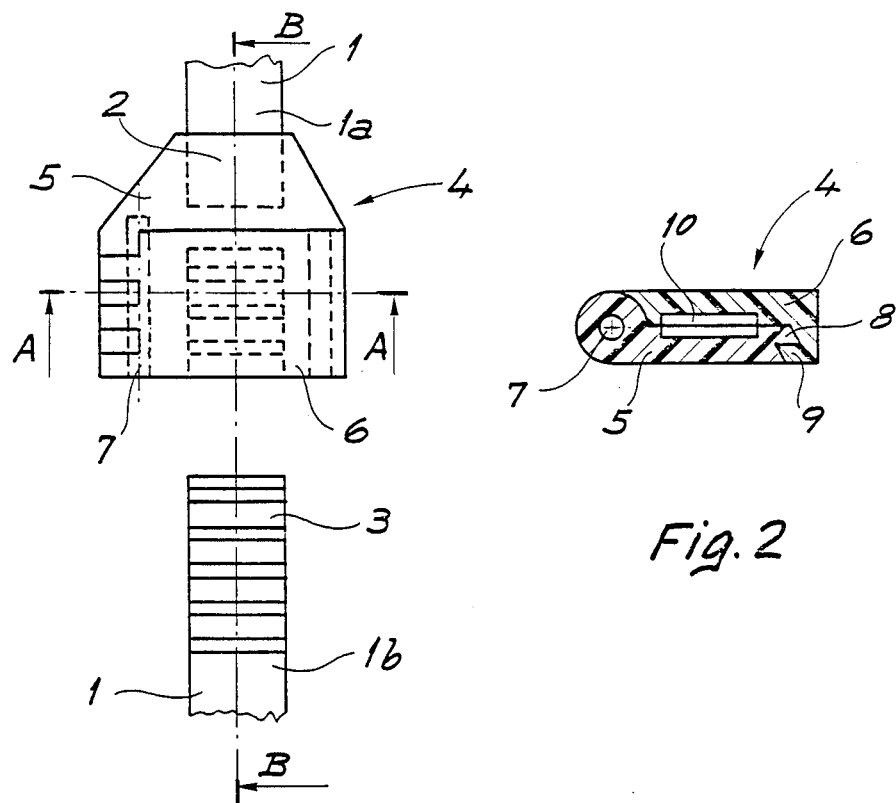
Fig. 1
Fig. 2
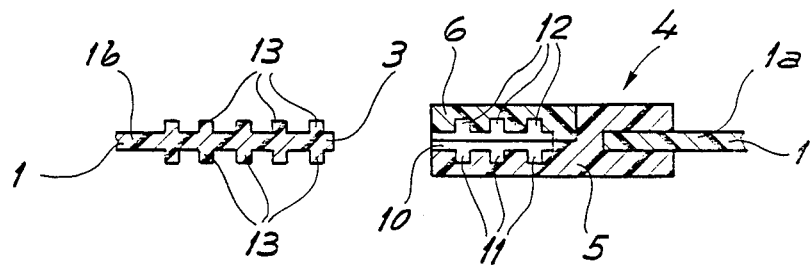
Fig. 3

ARTEFACT BAND WITH BONDED CLASP

BACKGROUND OF THE INVENTION

This invention relates to a fancy artefact of the kind including at least a first band of generally elongated shape and a clasp secured to one end of said first band to connect said one end to the other end of said first band or to one end of another band.

Such an artefact for instance be a wristlet as for a watch, a belt, a shoulder-bag strap, etc.

The clasps of such fancy artefacts mostly comprise a buckle, often made of metal, which is hingedly mounted at one end of the band, or of one of two bands, comprised by the fancy artefact. The buckle is fitted with a tongue adapted to engage in a hole made in the other end of the band or in one end of the other band.

The buckle and tongue must be separately manufactured and then fitted where required.

The production of clasps involving such components therefore involves a fairly sizeable series of operations that increase the cost price of the fancy artefact. Besides, such buckles and tongues are not very aesthetic.

SUMMARY OF THE INVENTION

An object of the invention is to provide a fancy artefact of the above set forth kind, which is of pleasing appearance and whose clasp is very cheap to produce and more attractive than known clasps.

According to the invention there is provided a fancy artefact of the above set forth kind, wherein said first band is made at least in part of a first thermoplastic plastic material, wherein said clasp comprises a first portion which is made of a second thermoplastic plastic material having a melting temperature greater than that of said first plastic material, which surrounds one end of said first band and which is solid therewith, wherein said clasp comprises a second portion hingedly mounted on said first portion and movable relatively thereto to open and close said clasp, said first and second clasp portions defining therebetween, when the clasp is closed, a cavity for receiving, when the clasp is open, said other end of said first band or said one end of said other band, and wherein at least one of said first and second clasp portions have means able to cooperate with compatible means provided on said other end of said first band or on said one end of said other band to fasten said other end of said first band or one end of said other band in said cavity when the clasp is closed.

BRIEF DESCRIPTION OF THE DRAWINGS

In the accompanying diagrammatic drawings, given by way of example:

FIG. 1 is a plan view of part of a watch wristlet and of closure means therefor embodying a fancy artefact according to the invention;

FIGS. 2 and 3 are respectively sections along lines A—A and B—B of FIG. 1;

Figure 4:
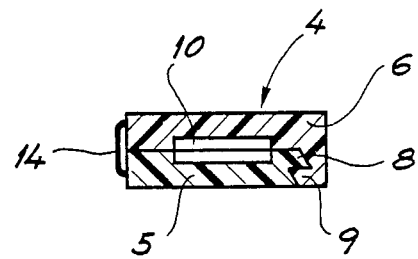
FIG. 4 is a section similar to that of FIG. 2 of a modified form of clasp used in the wristlet closure means shown in FIGS. 1 to 3.

The wristlet, 1, shown in FIGS. 1 and 3 comprises a pair of bands 1a and 1b. Bands 1a and 1b are intended to be secured by one of their ends, in any appropriate manner, to a watch case not shown.

In the following description, only the other ends, 2 and 3, of bands 1a and 1b are involved.

The closure means of FIGS. 1 to 3 serve to connect ends 2 and 3 and comprise a clasp 4 having a base portion 5 and a flap portion 6. Part of base portion 5 fits closely around and is solid with end 2. Clasp portions 5 and 6 are hingedly connected by a pin 7 to form a kind of hinge assembly, with pin 7 extending through coaxial apertures provided in portions 5 and 6.

Clasp portions 5 and 6 have disengageable snapping edges 8 and 9 along at least part of their side opposite pin 7 and parallel thereto.

Edges 8 and 9 are so shaped that portions 5 and 6 will firmly hook on each other when clasp 4 is closed, yet can be separated at will to open clasp 4.

The actual shape of snapping edges 8 and 9 will not be described in detail here and may fairly freely be determined.

For the snapping action and the subsequent disengagement to be possible, one or both of clasp portions 5 and 6 should be sufficiently resilient, at least in the region of edges 8 and 9. This resiliency may be achieved by suitably selecting the material used to produce the relevant clasp and the shape of the latter in the region of edges 8 and 9.

When clasp 4 is closed, it defines in its central part a cavity 10 which is open at the end of clasp 4, remote from wristlet end 2.

The walls of clasp portions 5 and 6 that define cavity 10 are formed with facing recesses 11 and 12 which in the present case consist of parallel grooves extending perpendicularly to the wristlet's centre line.

Wristlet end 3 is formed with protuberances 13 shaped and arranged to fit recesses 11 and 12. In the present case, protuberances 13 consist of parallel ribs also extending perpendicularly to the wristlet's centre line.

Protuberances 13 are designed to cooperate with recesses 11 and 12 to retain wristlet end 3 in clasp 4 when the latter is closed.

Clasp portion 5 or clasp portion 6 may, by way of modification, not be provided with recesses 11 or recesses 12. In such a case, wristlet end 3 is only provided with protuberances 13 on the side thereof that will face the remaining recesses in cavity 10. This modified arrangement has not been illustrated.

The simple way in which clasp 4 works will be readily apparent from the drawings without it being necessary to say any more about it.

Wristlet band 1a of FIGS. 1 and 3 is made, in a manner that will be described later, of a first thermoplastic plastic material having the property of being flexible at the usual temperatures of use. Such a material may for instance be a thermoplastic elastomer. Good results have been obtained with a material sold by Atochem of Serquigny in France under the trademark Pebax.

Wristlet band 1b is made, in a manner that will also be described later, of a thermoplastic plastic material which, preferably, is the same as that used for band 1a, but which may if desired be different.

Clasp portion 5 is made, in a manner also to be described later, of a thermoplastic plastic material having the property of being solid at the usual temperatures of use and, in addition, of being able to adhere well to the plastic material used for band 1a. This second plastic material may, for instance, be a polyamide resin of the kind sold by Atochem, referred to above, under the trademark Rilsan.

Clasp portion 6 is made, in a manner also to be described later, of a thermoplastic plastic material which, preferably, is the same as that used for clasp portion 5, but which may if desired be different.

The fancy artefact consisting of wristlet 1 and of clasp 4 may be manufactured in a most simple way. This consists in first injecting the plastic material selected for band 1a into an appropriately shaped mould at a temperature equal to or greater than its melting temperature.

Of band 1b is made of the same material as band 1a, it may be made at the same time as the latter, the mould being then suitably designed for the purpose.

If band 1b is made of another material than band 1a, it is separately moulded by injecting into a suitably shaped mould the plastic material chosen therefor.

In both cases, protuberances 13 are formed at the same time as the remainder of band 1b.

Once band 1a has been produced in the manner described above, its end 2 is placed in a second mould suitably shaped to produce clasp portion 5, in the position end 2 is required to have, relatively to portion 5, in the finished assembly. The plastic material selected for portion 5 is then injected into the second mould, at a temperature equal to or greater than its melting temperature.

The two plastic materials are selected so that the first, used to form band 1a, has a melting temperature less than the second, used to form portion 5.

In so doing, the end 2 of band 1a is heated to a temperature greater than the melting temperature of the first plastic material by the second plastic material as it comes into contact therewith during injection.

This heating action causes at least superficial melting of the first plastic material at wristlet end 2. In the region where the two melting materials are in contact, there is formed a layer consisting of an intimate mixture, or even a kind of alloy, of the two plastic materials.

Once cooled, the layer provides a mechanical bond between band 1a and clasp portion 5 which therefore become solid with one another.

Clasp portion 6 may be made of the same material as portion 5. In that case, it is best made at the same time as the latter, the second mould being then suitably designed for the purpose.

Clasp portion 6 may also be made of a material other than that of portion 5. In that case, it may for instance be made by injecting into a suitably shaped mould the plastic material chosen therefor.

Clasp portion 6 is then connected to portion 5 by fitting pin 7 into the apertures provided for the purpose. Pin 7 may have a uniformly cylindrical shape and be made of brass.

In the modified form of clasp 4 shown in FIG. 4, pin 7 and the associated apertures provided on portions 5 and 6 of the clasp shown in FIGS. 1 to 3 are done away with. Instead, clasp portions 5 and 6 are connected by a connecting portion 14 consisting, for instance, of a thin membrane of the same material as portions 5 and 6. This thin membrane is made at the same time as portions 5 and 6 and is integral therewith. The shape and size of connecting portion 14 are so chosen as to enable the latter to be flexible and hence enable relative motion between portions 5 and 6 to open and close clasp 4.

Figure 5:
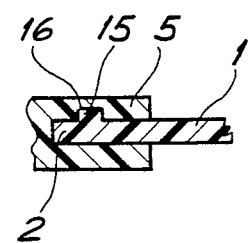
FIGS. 5 to 7 are sections along line B—B of FIG. 1 of three modified forms of a detail of the wristlet closure means shown in FIGS. 1 to 3.
Figure 6:
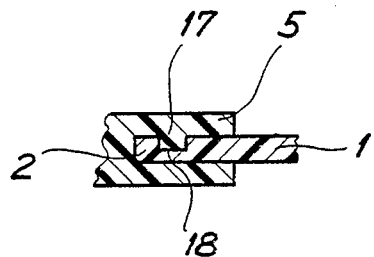

In FIGS. 5 and 6 wristlet end 2 and clasp portion 5 are differently bonded. In FIG. 5, wristlet end 2 is formed with a protuberance 15 which engages in a correspondingly shaped recess 16 provided in clasp portion 5. FIG. 6 provides a reverse arrangement with clasp portion 5 having a protuberance 17 which engages in a correspondingly shaped recess 18 in wristlet end 2.

In these two modified arrangements, protuberances 15 and 17 may have any shape. Alternatively, a plurality of similar protuberances may be provided on the same side of wristlet end 2 or on both sides thereof. These protuberances may for instance consist of transverse ribs fully surrounding wristlet 1. In either case, recesses 16 or 18 are correspondingly shaped.

The purpose of the above described protuberances and recesses is to reinforce the bond between wristlet 1 and clasp portion 5. Their presence also widens the range of materials that can be used to produce wristlet 1 and clasp portion 5 since these materials are no longer required to adhere to one another as in the case of FIGS. 1 to 3.

Figure 7:
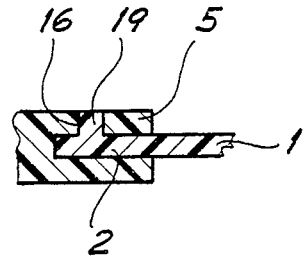

In the arrangement shown in FIG. 7, wristlet end 2 is formed with a protuberance 19 having a thickness such that it extends through the wall of clasp portion 5 and becomes visible at the outer surface thereof.

The shape of the visible part of protuberance 19 can be freely selected. The latter may therefore also have an aesthetic effect, in addition to its reinforcing action on the bond between wristlet 1 and clasp portion 5.

If desired, a plurality of protuberances such as protuberance 19 may be provided.

The presence of the above described protuberances and recesses does not complicate the manufacture of the wristlet and of its closure means since the protuberances and/or the recesses provided on or in wristlet 1 are produced by giving the mould used for the manufacture of the latter the required shape. The corresponding recesses and/or protuberances in or on clasp portion 5 are automatically produced when injecting the second plastic material.

The various constructional forms of wristlet illustrated in FIGS. 8 to 12 may be combined with an of the arrangements described above.

In all of these constructional forms, wristlet 1, of which only band 1a is shown, comprises a core portion 1a' and decorative portions 20, the latter preferably being made of the same plastic material as clasp portion 5.

Decorative portions 20, which are annular, closely surround the wristlet core portion 1a' over part of its length and are solid therewith. They are spaced by regular or irregular gaps such that the core portion 1a' is visible in the intermediate gaps.

Figures 8, 9, 10, 11, 12:
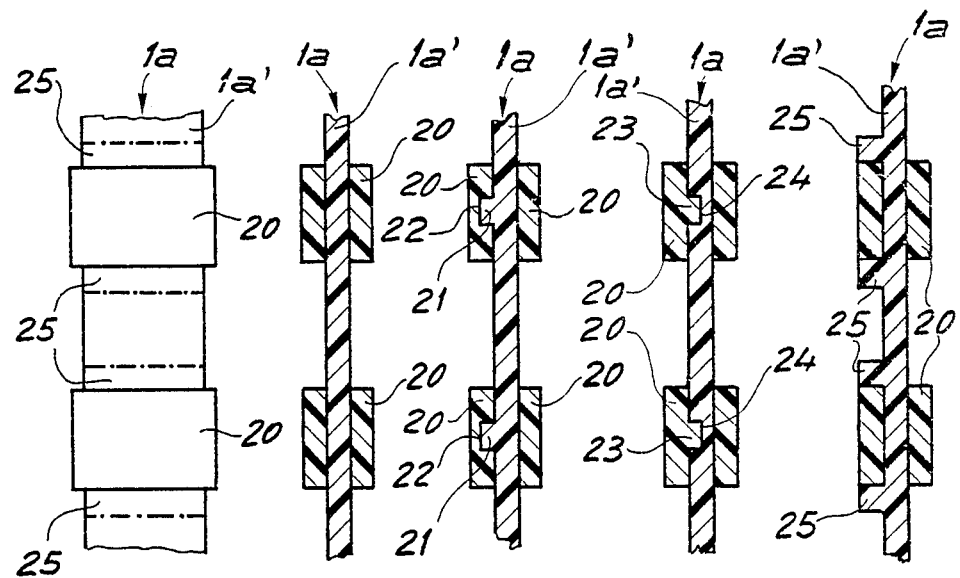
FIGS. 9 to 12 are side views, in longitudinal section, of four constructional forms for the wristlet used in the arrangement shown in FIGS. 1 to 3.
FIG. 8 is a plan view of the constructional forms shown in FIGS. 9 to 12.

In the constructional form shown in FIG. 9, the bond between decorative portions 20 and the wristlet core portion 1a' is achieved by adherence of the constituent plastic materials, as in the case of the bond between the wristlet 1 and clasp portion 5 in FIGS. 1 and 3.

In the constructional form shown in FIG. 10, the wristlet core portion 1a' has protuberances 21 which engage in recesses 22 formed in decorative portions 20.

As with protuberances 19 in FIG. 7, protuberances 21 of FIG. 10 may have a thickness such as to become visible at the surface of decorative portions 20. This possibility has not been illustrated.

In the constructional form shown in FIG. 11, decorative portions 20 have protuberances 23 which engage in recesses 24 formed in the wristlet core portion 1a'.

In the constructional form shown in FIG. 12, the wristlet core portion 1a' has protuberances 25 on opposite sides of decorative portions 20. Protuberances 25, which are visible when band 1a is viewed in plan, have been depicted in chain-dotted lines in FIG. 8 which is otherwise a common plan view of the previous constructional forms of wristlet 1 shown in FIGS. 9 to 12.

The purpose of the above described protuberances 21, 23 and 25 and recesses 22 and 24 is to reinforce the bond between the core portion 1a' of band 1a and decorative portions 20.

Protuberances 21 of FIG. 10, when thick enough to be visible at the surface of decorative portions 20, and protuberances 25 of FIG. 12 also provide an aesthetic effect.

Protuberances 21, 23 and 25 may also have any desired shape or size. They may be arranged on one side only of the wristlet core portion 1a' or on both sides. They may, for instance, consist of transverse ribs that fully surround the wristlet core portion 1a'.

In the cases of FIGS. 10 and 11, recesses 22 and 24 have a shape corresponding to that of protuberances 21 and 23.

In the case of FIG. 12, protuberances 25 need not contact decorative portions 20 over their full length. Contact need only be made in one or more locations along the sides of decorative portions 20.

In all of the constructional forms of wristlet shown in FIGS. 9 to 12, the outer surfaces of decorative portions 20 may have any desired shape.

The presence of decorative portions 20 on the wristlet core portion does not increase its cost price since decorative portions 20 can readily be produced during the same injection operation as clasp portion 5. Further, the various recesses and/or protuberances provided in the several constructional forms of wristlet shown in FIGS. 10 to 12 are produced by suitably shaping the mould used for receiving the first plastic material. The corresponding recesses and/or protuberances in or on decorative portions 20 are produced automatically during injection of the second plastic material.

The outer surfaces of wristlet 1, of clasp portions 5 and 6 and of decorative portions 20 described above are not necessarily plane as shown in FIGS. 1 to 12 but may for instance be concave or convex. Instead of being smooth, these surfaces may be rough, grooved, etc.

All of these modified forms that have not been shown may be produced by suitably shaping the moulds used to manufacture these various components.

The invention as described above with reference to the drawings, and all other possible modifications, applies to all fancy artefacts within the scope of the following claims. These artefacts may have two bands, as in the case of the watch wristlet described and illustrated, or only a single band, like belts. In this latter case, one end of the single band is solid with a clasp such as clasp 4 and the other end of the band formed with protuberances, such as protuberances 13 in FIGS. 1 and 2, able to cooperate with recesses in the clasp, such as recesses 11 and/or 12 in these two Figures.

The appearance of the artefacts may readily be modified by using different plastic materials and/or changing their colour.

Their appearance may also be modified by changing the shape of the moulds into which the plastic materials are injected.

Further, artefacts according to the invention are well suited to mass production so that their cost price may be kept quite low.

We claim:

1. An artefact including at least a first band of generally elongated shape and a clasp secured to a first end of said first band to connect said first end to a second end of said first band or to one end of another band, wherein said first end of said first band is made of a first thermoplastic plastic material having a first melting temperature, wherein said clasp comprises a first portion which is made of a second thermoplastic plastic material having a second melting temperature greater than said first melting temperature and having at least a part thereof surrounding and immovably bonded to said first end of said first band, wherein said clasp comprises a second portion hingedly mounted on said first portion and movable relatively thereto to open and close said clasp, said first and second clasp portions defining therebetween, when the clasp is closed, a cavity for receiving said second end of said first band or said one end of said other band, and wherein at least one of said first and second clasp portions comprises means able to cooperate with compatible means provided on said second end of said first band or on said one end of said other band to fasten said second end of said first band or said one end of said other band in said cavity when the clasp is closed.

2. An artefact as in claim 1, wherein said first clasp portion is immovably bonded to said first end of said first band by a layer comprising a fused mixture of said first and second thermoplastic plastic materials.

3. An artefact as in claim 1, wherein said first clasp portion is formed with a recess and said first end of said first band has a protuberance which engages in said recess.

4. An artefact as in claim 1, wherein said first end of said first band is formed with a recess and said first clasp portion has a protuberance which engages in said recess.

5. An artefact as in claim 1, wherein said first and second clasp portions each have means able to cooperate with one another to keep said clasp closed.

6. An artefact as in claim 1, wherein said clasp comprises hinge means including coaxial apertures in said first and second clasp portions and a pin extending through said apertures.

7. An artefact as in claim 1, wherein said second clasp portion is made of said second thermoplastic plastic material.

8. An artefact as in claim 1, wherein said second clasp portion is made of said second thermoplastic plastic material and said clasp further comprises a hinge portion, also made of second thermoplastic plastic material, between and integral with said first and second portions.

9. An artefact as in claim 1, wherein said first band comprises a core portion made of said first thermoplastic material and an annular decorative portion surrounding and secured to said core portion over part of its length, said decorative portion being made of said second thermoplastic plastic material.

10. An artefact as in claim 9, wherein said decorative portion is solid with said core portion through adherence of said first and second thermoplastic plastic materials.

11. An artefact as in claim 9, wherein said decorative portion is formed with a recess and said core portion has a protuberance which engages in said recess.

12. An artefact as in claim 9, wherein said core portion is formed with a recess and said decorative portion has a protuberance which engages in said recess.

13. An artefact as in claim 9, wherein said first band comprises a plurality of said annular decorative portions spaced from each other by an intermediate gap through which said core portion is visible.

14. An artefact as in claim 3, wherein said protuberance has a thickness such that it extends through a wall of said first clasp portion so as to be visible at the outer surface of said first clasp portion.

* * * * *